US006708093B2

(12) United States Patent
(10) Patent No.: US 6,708,093 B2
(45) Date of Patent: Mar. 16, 2004

Totani et al.

(54) VEHICLE AUDIO INTERFACE ADAPTER

(75) Inventors: Tsutomu Totani, Nagoya (JP); Yasuo Serikawa, Nagoya (JP)

(73) Assignee: Beat-Sonic Co., Ltd., Aichi (JP)

( * ) Notice: Subject to any disclaimer, the term of this patent is extended or adjusted under 35 U.S.C. 154(b) by 0 days.

(21) Appl. No.: 10/071,897

(22) Filed: Feb. 8, 2002

(65) Prior Publication Data

US 2002/0120377 A1 Aug. 29, 2002

(30) Foreign Application Priority Data

Feb. 26, 2001 (JP) ....................................... 2001-050686

(51) Int. Cl.[7] .................................................. G06F 7/00
(52) U.S. Cl. ................................ 701/36; 701/1; 701/46
(58) Field of Search ................................ 701/1, 36, 46; 455/149, 151.4, 517

(56) References Cited

U.S. PATENT DOCUMENTS 6,058,319 A * 5/2000 Sadler ........................ 455/569
6,424,820 B1 * 7/2002 Burdick et al. ............... 455/41

* cited by examiner

*Primary Examiner*—Gertrude A. Jeanglaude
(74) *Attorney, Agent, or Firm*—Koda & Androlia

(57) ABSTRACT

An audio interface adapter is used with a vehicle audio system including a power amplifier, a genuine head unit serving as a tuner and including an operation panel, the power amplifier and the operation panel of the head unit being connected with each other by a LAN cable, and a plurality of loud speakers provided in a vehicle interior. The audio interface adapter is interposed between a non-genuine head unit and the power amplifier when the genuine head unit is replaced with the non-genuine head unit, the audio interface adapter generating a LAN signal so that the power amplifier is controlled.

2 Claims, 1 Drawing Sheet

VEHICLE AUDIO INTERFACE ADAPTER

BACKGROUND OF THE INVENTION

1. Field of the Invention

This invention relates to a vehicle audio interface adapter suitable for use in a super live sound system as a vehicle audio system in order that a genuine head unit of the system may be replaced by a commercially available non-genuine head unit.

2. Description of the Related Art

A super live sound system generally comprises a head unit 1, a power amplifier 2, seven to ten loud speakers 3-1 to 3-n, one or a plurality of dedicated connectors 4 and 5 connecting the head unit 1 to the power amplifier 2 and the like, and one or a plurality of dedicated connectors 6 connecting output of the power amplifier 2 to the loud speakers 3-1 to 3-n, as shown in FIG. 1.

A digital control type power amplifier 2 is employed in some setting so that a digital sound processor (DSP) function, balance, fader, sound volume, equalizer, etc. are controlled on the basis of setting information transmitted from the head unit 1 serving as an operating section, in a digital communication manner.

In the foregoing digital control type power amplifier 2, on-off control of a power supply is also carried out in the digital communication manner. Accordingly, when the head unit 1 is replaced by a commercially available non-genuine deck having no communicating function, the power amplifier 2 fails such that no sound is produced. Thus, an adapter used for replacing the genuine head unit with a commercially available non-genuine deck needs to have a function replacing the communication of the foregoing head unit 1.

SUMMARY OF THE INVENTION

Therefore, an object of the present invention is to provide a vehicle audio interface adapter which can be used when the genuine head unit is replaced with a commercially available non-genuine head unit, and which can provide presence or realism in the super live sound system with the use of a genuine power amplifier.

The present invention provides an audio interface adapter used with a vehicle audio system including a power amplifier, a genuine head unit serving as a tuner and including an operation panel, the power amplifier and the operation panel of the head unit being provided with respective microcomputers and connected with each other by a LAN cable, and a plurality of loud speakers provided in a vehicle interior, the audio interface adapter being interposed between a non-genuine head unit and the power amplifier when the genuine head unit is replaced with the non-genuine head unit, the audio interface adapter generating a LAN signal so that the power amplifier is controlled.

In a preferred form, the audio interface adapter further comprises a transformer incorporated therein for matching an input level of the power amplifier with an output level of the non-genuine head unit.

BRIEF DESCRIPTION OF THE DRAWINGS

Other objects, features and advantages of the present invention will become clear upon reviewing the following description of an embodiment, made with reference to the accompanying drawings, in which.

DETAILED DESCRIPTION OF AN EMBODIMENT

Figure 1:
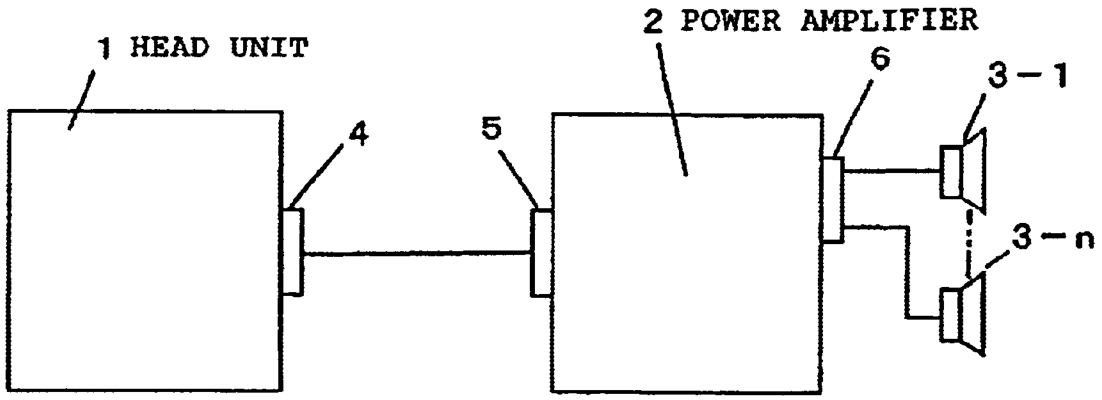
FIG. 1 PRIOR ART
FIG. 1 is a schematic block diagram showing an electrical arrangement of a super live sound system.
Figure 2:
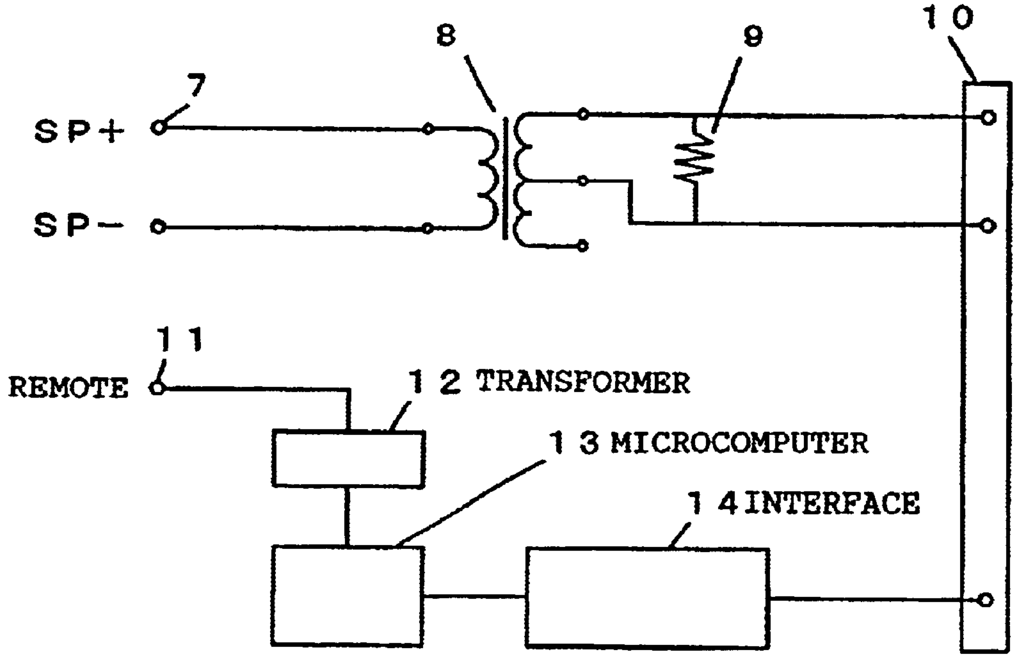
FIG. 2 is a schematic circuit diagram showing an electrical arrangement of an adapter of one form in accordance with the present invention.

One embodiment of the present invention will be described with reference to the accompanying drawings. Referring to FIG. 2, reference numeral 7 designates a terminal connecting a speaker output of a commercially available non-genuine deck. Reference numeral 8 designates a transformer for converting voltage and impedance so that the speaker output of the commercially available non-genuine deck is rendered suitable as an input to the power amplifier 2. Reference numeral 9 designates a resistor adjusting a sound signal voltage. Reference numeral 10 designates a connector which can be directly connected to a connector 4 further connected to the genuine head unit 11.

The non-genuine deck, an operation panel (not shown) of the deck and power amplifier 2 are provided with respective microcomputers and connected with one another by a LAN cable.

A sound signal of the commercially available non-genuine deck is supplied via the terminal 7 to a primary side of the transformer 8. A secondary output with converted voltage and impedance is adjusted by the resistor 9 and thereafter connected via a terminal of the connector 10 to the power amplifier 2. The sound signal is usually assigned with 2 to 4 channels, and a signal with another channel is also connected to the power amplifier 2 in the same manner as described above. When a woofer signal is required, 2-channel or 4-channel signals are synthesized into a signal which is connected to the power amplifier 2, although a synthesizing method is not described.

A remote terminal 11 of the commercially available non-genuine deck is usually provided for controlling an external amplifier or the like. The remote terminal 11 is at 12 V when a power supply of the deck is in an ON-state, whereas the remote terminal 11 is at 0 V when the power supply is in an OFF-state. The voltage is converted by a transformer so as to match a 5-V power supply of a microcomputer 13 system and thereafter input to the microcomputer 13.

When the remote terminal 11 is at 12 V, an ON command is delivered via an interface 14 and the terminal of the connector 10 to the power amplifier 2. A setting command such as volume label or equalizer is also delivered, if necessary. Furthermore, when the remote terminal is turned to 0 V, an OFF command is delivered via the interface 14 and the terminal of the connector 10 to the power amplifier 2.

The hardware specification and software specification of the digital communication differ from one another depending upon types of vehicles. For example, one type of vehicle uses IEBus proposed by Nippon Electric Co., Ltd. An interface changes depending upon the hardware specification.

According to the above-described embodiment, the adapter is interposed between the power amplifier 2 and the commercially available non-genuine deck replaced used instead of the head deck. The adapter generates a LAN signal so that the power amplifier 2 can be controlled. Furthermore, the resistor 9 of the integrated transformer 8 is adjusted so that the output level of the commercially available non-genuine deck can match the input level of the power amplifier 2. Consequently, the head unit can be replaced by the commercially available non-genuine deck in the super live sound system serving as the vehicle audio system. Furthermore, the adapter can be used with latest audio equipment such as CD and MD. Additionally, the adapter can provide presence or realism in the super live sound system with the use of a genuine power amplifier.

The foregoing description and drawing are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An audio interface adapter used with a vehicle audio system including a power amplifier, a genuine head unit serving as a tuner and including an operation panel, the power amplifier and the operation panel of the head unit being provided with respective microcomputers and connected with each other by a LAN cable, and a plurality of loud speakers provided in a vehicle interior, the audio interface adapter being interposed between a non-genuine head unit and the power amplifier when the genuine head unit is replaced with the non-genuine head unit, the audio interface adapter generating a LAN signal so that the power amplifier is controlled.

2. An audio interface adapter according to claim 1, further comprising a transformer incorporated therein for matching an input level of the power amplifier with an output level of the non-genuine head unit.

* * * * *